(12) United States Patent
Thakkar et al.

(10) Patent No.: US 7,862,187 B2
(45) Date of Patent: Jan. 4, 2011

(54) MICROSTRUCTURED ARTICLES COMPRISING NITROGEN CONTAINING INGREDIENT

(75) Inventors: Bimal V. Thakkar, Woodbury, MN (US); David B. Olson, Marine on St. Croix, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 326 days.

(21) Appl. No.: 11/734,349

(22) Filed: Apr. 12, 2007

(65) Prior Publication Data

US 2007/0242357 A1  Oct. 18, 2007

Related U.S. Application Data

(60) Provisional application No. 60/745,033, filed on Apr. 18, 2006.

(51) Int. Cl.
*G02B 5/124* (2006.01)
(52) U.S. Cl. ...................................... 359/530
(58) Field of Classification Search ............. 359/530
See application file for complete search history.

(56) References Cited

U.S. PATENT DOCUMENTS

| | | | |
|---|---|---|---|
| 4,025,159 A | 5/1977 | McGrath | |
| 4,208,090 A | 6/1980 | Heenan | |
| 4,801,193 A | 1/1989 | Martin | |
| 5,117,304 A | 5/1992 | Huang et al. | |
| 5,272,562 A | 12/1993 | Coderre | |
| 5,450,235 A * | 9/1995 | Smith et al. | 359/529 |
| 5,491,586 A | 2/1996 | Phillips | |
| 5,642,222 A | 6/1997 | Phillips | |
| 5,691,846 A | 11/1997 | Benson, Jr. et al. | |
| 5,784,197 A | 7/1998 | Frey et al. | |
| 5,930,041 A | 7/1999 | Thielman | |
| 5,936,770 A | 8/1999 | Nestegard et al. | |
| 5,988,820 A | 11/1999 | Huang et al. | |
| 6,004,422 A | 12/1999 | Janovec et al. | |
| 6,039,909 A | 3/2000 | Bernard et al. | |

(Continued)

FOREIGN PATENT DOCUMENTS

| | | |
|---|---|---|
| CN | 1578729 | 2/2005 |
| EP | 0714040 B1 | 11/2004 |
| WO | WO 03037648 A2 * | 5/2003 |

OTHER PUBLICATIONS

Aminoplast Glues Manufacturers Association, Chemistry Sectors: Paints, Coatings & Adhesives, 2 pages printed from website www.cefic.be on Jan. 30, 2006.
U.S. Appl. No. 11/379,130, filed Apr. 18, 2006.

*Primary Examiner*—Stephone B Allen
*Assistant Examiner*—Jennifer L. Doak
(74) *Attorney, Agent, or Firm*—Sandra K. Nowak (57) ABSTRACT

Microstructured articles, such as a retroreflective articles, having a plurality of (e.g. cube-corner) microstructured elements projecting from a major surface are described. The microstructured (e.g.) cube-corner elements or interface with an adjacent layer comprises certain nitrogen-containing ingredients. The inclusion of such nitrogen-containing ingredients can improve the adhesion of the (e.g. cube-corner) elements to adjacent (e.g. olefinic) layers such as a body layer, seal film layer, or combination thereof. The flexible retroreflective articles have a light transmissive polymeric body layer having an elastic modulus of less than $7 \times 10^8$ pascals.

23 Claims, 1 Drawing Sheet

U.S. PATENT DOCUMENTS

| | | |
|---|---|---|
| 6,142,643 A | 11/2000 | Araki et al. |
| 6,143,224 A | 11/2000 | Bernard et al. |
| 6,200,666 B1 | 3/2001 | Christian et al. |
| 6,231,797 B1 | 5/2001 | Bernard et al. |
| 6,318,867 B1 | 11/2001 | Bacon, Jr. et al. |
| 6,350,035 B1 | 2/2002 | Smith et al. |
| 6,428,889 B1 | 8/2002 | Nagaoka |
| 6,677,028 B1 | 1/2004 | Lasch et al. |
| 6,899,944 B2 | 5/2005 | Tanaka et al. |
| 7,361,402 B2 | 4/2008 | Johnson |
| 2002/0126382 A1* | 9/2002 | Smith et al. ........ 359/530 |
| 2005/0079324 A1* | 4/2005 | Haunschild et al. ...... 428/143 |
| 2005/0221042 A1 | 10/2005 | Chirhart et al. |

* cited by examiner

*Fig. 1*

*Fig. 2*

MICROSTRUCTURED ARTICLES COMPRISING NITROGEN CONTAINING INGREDIENT

RELATED APPLICATION DATA

This application claims the benefit of U.S. Provisional Application No. 60/745,033, filed Apr. 18, 2006.

BACKGROUND

Retroreflective sheetings have the ability to redirect incident light towards its originating source. This ability has led to the wide-spread use of retroreflective sheetings on a variety of articles. There are essentially two types of retroreflective sheeting: beaded sheeting and cube-corner sheeting. Beaded sheeting employs a multitude of glass or ceramic microspheres to retroreflect incident light. Cube-corner sheeting, on the other hand, typically employs a multitude of rigid, interconnected, cube-corner elements to retroreflect incident light.

Flexible retroreflective sheeting, particularly well-suited for use on irregular surfaces or for attachment to flexible substrates such as a road worker's safety vest has been described. See for example, U.S. Pat. Nos. 5,450,235; 5,691,846; 5,784,197 and 6,318,867.

SUMMARY

Microstructured articles, such as retroreflective articles, having a plurality of (e.g. cube-corner) microstructured elements projecting from a major surface are described.

The microstructured (e.g. cube-corner) elements or at least the interface between the elements and an adjacent (e.g. body) layer comprise certain nitrogen-containing ingredients. The inclusion of such nitrogen-containing ingredients can improve the adhesion of the (e.g. cube-corner) elements to adjacent (e.g. olefinic) layers such as a body layer, seal film layer, or combination thereof.

In some preferred embodiments, flexible retroreflective articles are described having a light transmissive polymeric body layer having an elastic modulus of less than $7 \times 10^8$ pascals. In one aspect, the cube-corner elements or at least the interface between the elements and an adjacent (e.g. body) layer comprise the reaction product of a polymerizable resin composition comprising at least 2 wt-% of a polymerizable amine-containing ingredient, a (meth)acrylate functional nitrogen-containing ingredient, a nitrogen containing polymer, or mixture thereof. The nitrogen-containing polymer is preferably soluble in the polymerizable resin. Further, the nitrogen-containing polymer is typically free of polymerizable groups.

In another aspect, the (e.g. cube-corner) microstructured elements comprise the reaction product of a polymerizable resin comprising at least 2 wt-% of a polymerizable amine-containing ingredient.

DETAILED DESCRIPTION OF PREFERRED EMBODIMENTS

The invention relates to microstructured articles wherein the microstructures are formed from and thus comprise a solidified resin composition. The microstructures are typically provided on a body layer. The microstructures and the body layer are typically light transmissive. The solidified resin composition comprises at least one nitrogen-containing ingredient. In some embodiments, nitrogen-containing ingredient improves the adhesion of the microstructures to an adjacent layer of the article such as the body layer or seal film. In some embodiments, the microstructures comprise the reaction product of a polymerized resin.

The term "microstructure" is used herein as defined and explained in U.S. Pat. No. 4,576,850. Microstructures are generally discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations will typically be about +/−0.005 to +/−750 microns, as measured by an optical or electron microscope, through a representative characteristic length of the surface, e.g., 1-30 cm. The average center line can be plano, concave, convex, aspheric or combinations thereof. Articles where the deviations are of low order, e.g., from +/−0.005+/−0.1 or, preferably, +/−0.05 microns, and the deviations are of infrequent or minimal occurrence, i.e., the surface is free of any significant discontinuities, can be considered to have an essentially "flat" or "smooth" surface. Other articles have deviations are of high-order, e.g., from +/−0.1 to +/−750 microns, and attributable to microstructure comprising a plurality of utilitarian discontinuities which are the same or different and spaced apart or contiguous in a random or ordered manner.

As used herein, "sheeting" refers to a thin piece of polymeric (e.g. synthetic) material. The sheeting may be of any width and length, such dimension only being limited by the equipment (e.g. width of the tool, width of the slot die orifice, etc.) from which the sheeting was made. The thickness of retroreflective sheeting typically ranges from about 0.004 inches (0.1016 mm) to about 0.10 inches (2.54 mm). Preferably the thickness of retroreflective sheeting is less than about 0.012 inches (0.3048 mm) and more preferably less than about 0.010 inches (0.254 mm). In the case of retroreflective sheeting, the width is typically at least 12 inches (30 cm) and preferably at least 48 inches (76 cm). The sheeting is typically continuous in its length for up to about 50 yards (45.5 m) to 100 yards (91 m) such that the sheeting is provided in a conveniently handled roll-good. Alternatively, however, the sheeting may be manufactured as individual sheets rather than as a roll-good. In such embodiments, the sheets preferably correspond in dimensions to the finished article. For example, the retroreflective sheeting, may have the dimensions of a standard U.S. sign (e.g. 30 inches by 30 inches (76 cm by 76 cm) and thus the microstructured tool employed to prepare the sheeting may have about the same dimensions.

Figure 1:
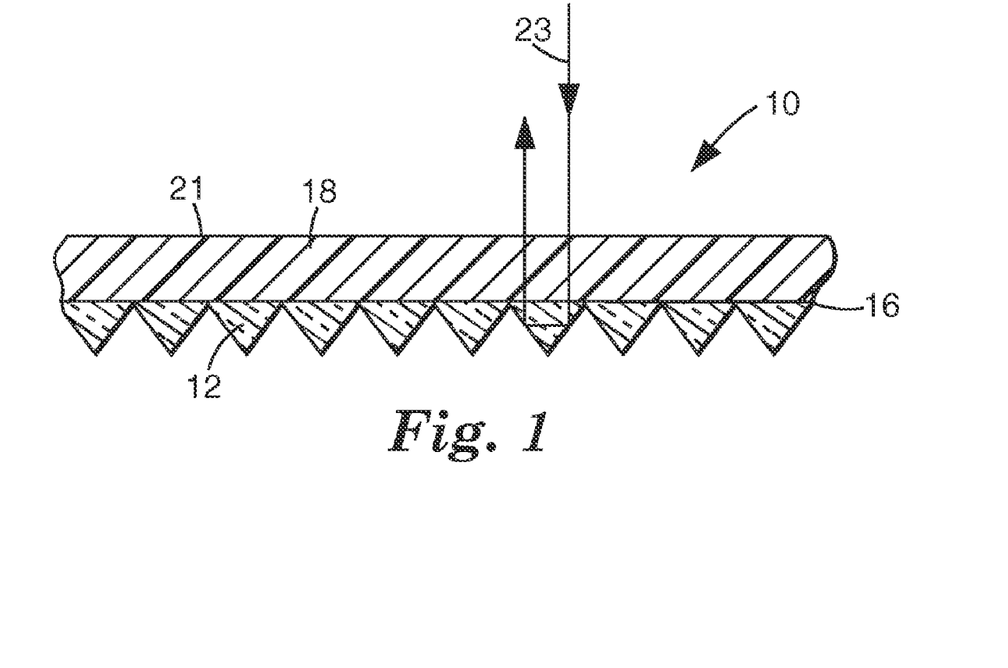
FIG. 1 is a cross-sectional view of exemplary cube-corner sheeting.

With reference to FIG. 1, exemplary cube-corner retroreflective sheeting 10 comprises a multitude of cube-corner elements 12 and a body layer 18. Body layer 18 may also be referred to as an overlay film as well as a base substrate. Body layer 18 typically has a thickness of at least 20 micrometers and more typically at least 50 micrometer. Body layer 18 usually has a thickness less than 1,000 micrometer, and typically no greater than 250 micrometers. The cube-corner elements 12 project from a first, typically rear side of body layer 18.

The cube-corner elements 12 and body layer 18 are typically formed from a light transmissive polymeric material.

This means that the polymer is able to transmit at least 70 percent of the intensity of the light incident upon it at a given wavelength. More preferably, the polymers that are used in the retroreflective sheeting of the invention have a light transmissibility of greater than 80 percent, and more preferably greater than 90 percent. When the retroreflective sheeting is employed for uses other than traffic safety, such as advertising displays, the light transmissibility may be as low as 5 to 10 percent.

In a preferred embodiment, the body layer 18 is the outermost layer on the front side of the sheeting 10. As shown in FIG. 1, light enters the cube-corner sheeting 10 through the front surface 21. The light then passes through the body portion 18 and strikes the planar faces of the cube-corner elements 12 and returns in the direction from which it came as shown by arrow 23. The body layer 18 functions to protect the sheeting from outdoor environmental elements and/or provides mechanical integrity to the sheeting.

The cube-corner retroreflective sheeting may include a land layer such as shown in U.S. Pat. No. 5,450,235. In some embodiments, the land layer is integral with the cube-corner elements meaning that the land and cubes are formed from a single polymeric material—not two different polymeric layers subsequently united together. Particularly for embodiments, wherein the retroreflective sheeting is flexible, the land layer 16, typically, has a thickness in the range of about 0 to 150 micrometers, and preferably in the range of approximately about 1 to 100 micrometers. The thickness of the land is preferably no greater than 10 percent of the height of the cube corner elements, and more preferably about 1 to 5 percent thereof. In sheetings having thicker land portions, it is typically more difficult to achieve decoupling of individual cube corner elements.

The cube-corner elements 12 typically have a height in the range of about 20 to 500 micrometers, and more typically in the range of about 35 to 100 micrometers. Although the embodiment of the invention shown in FIG. 1 has a single body layer 18, it is within the scope of the present invention to provide more than one body layer 18 (e.g. a multi-layer body).

Figure 2:
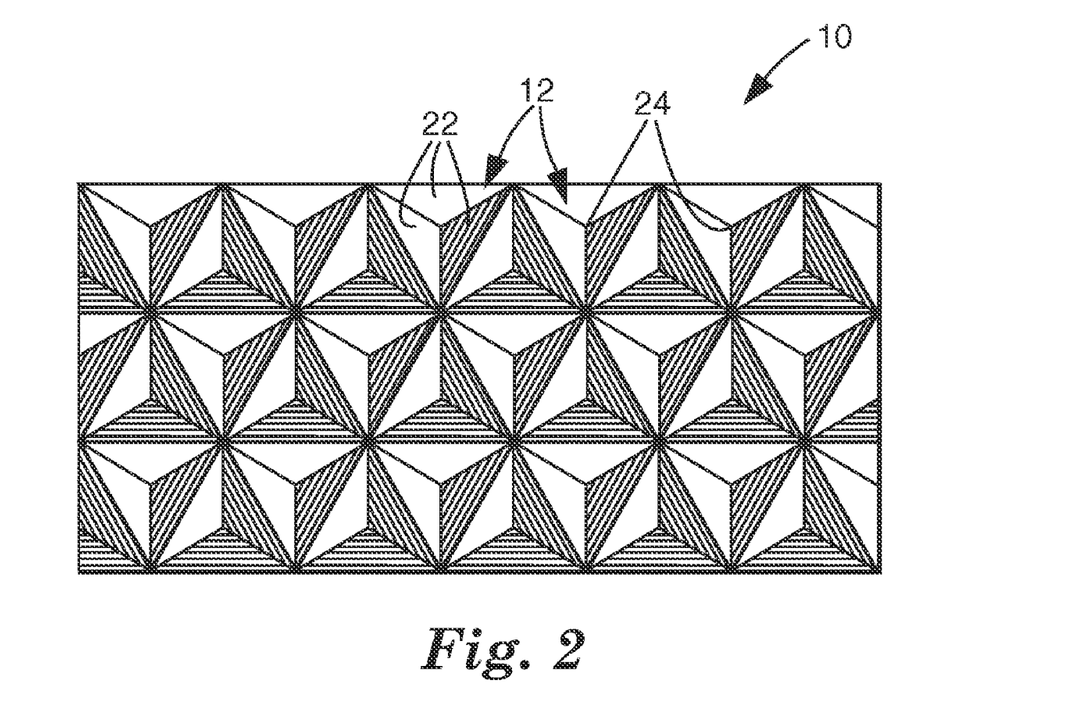
FIG. 2 is a perspective view of the cube-corner surface of exemplary sheeting.

FIG. 2 illustrates a perspective view of the cube-corner element surface which is typically the back side of the article. As shown, the cube-corner elements 12 are disposed as matched pairs in an array on one side of the sheeting. Each cube-corner element 12 has the shape of a trihedral prism with three exposed planar faces 22. The planar faces 22 may be substantially perpendicular to one another (as in the corner of a room) with the apex 24 of the prism vertically aligned with the center of the base. The angle between the faces 22 typically is the same for each cube-corner element in the array and will be about 90 degrees. The angle, however, can deviate from 90 degrees as is well-known. See, for example, U.S. Pat. No. 4,775,219 to Appledorn et al. Although the apex 24 of each cube-corner element 12 may be vertically aligned with the center of the base of the cube-corner element, see, for example, U.S. Pat. No. 3,684,348. The apex also may be canted to the center of the base as disclosed in U.S. Pat. No. 4,588,258. The present invention is not limited to any particular cube-corner geometry. Various cube-corner configurations are known such as described in U.S. Pat. Nos. 4,938,563; 4,775,219; 4,243,618; 4,202,600; and 3,712,706. The cube-corner sheeting described in U.S. Pat. No. 4,588,258 can provide wide angle retroreflection among multiple viewing planes.

A specular reflective coating such as a metallic coating (not shown) can be placed on the backside of the cube-corner elements to promote retroreflection. The metallic coating can be applied by known techniques such as vapor depositing or chemically depositing a metal such as aluminum, silver, or nickel. A primer layer may be applied to the backside of the cube-corner elements to promote the adherence of the metallic coating. In addition to or in lieu of a metallic coating, a seal film can be applied to the backside of the cube-corner elements; see, for example, U.S. Pat. Nos. 5,691,846; 5,784,197; and 6,318,867. The seal film maintains an air interface at the backside of the cubes to enhance retroreflectivity. A backing or an adhesive layer also can be disposed behind the cube-corner elements in order that the cube-corner retroreflective sheeting 10 can be secured to a substrate.

The cube-corner elements tend to be hard and rigid. The polymeric composition may be thermoplastic, yet is preferably a reaction product of a polymerizable (i.e. crosslinkable) resin. The elastic modulus of the composition of the cube-corner elements is typically greater than $16 \times 10^8$ pascals, preferably greater than $18 \times 10^8$ pascals, and more preferably is greater than $25 \times 10^8$ pascals. The term "elastic modulus" as used herein means the elastic modulus determined according to ASTM D882-75b using Static Weighing Method A with a 12.5 centimeter (5 inch) initial grip separation, a 2.5 centimeter (1 inch) sample width, and a 2.5 centimeter/minute (1 inch/minute) rate of grip separation.

For embodiments wherein the microstructured article is flexible, the body layer comprises a low elastic modulus polymer for easy bending, curling, flexing, conforming, or stretching. The body layer typically has an elastic modulus less than $13 \times 10^8$ pascals. The elastic modulus may be less than $7 \times 10^8$ pascals, less than $5 \times 10^8$ pascals or less than $3 \times 10^8$ pascals. The body layer typically has a glass transition temperature that is less than 25° C. The body layer typically has a Vicat softening temperature that is at least 50° C. Preferred polymeric materials used in the body layer are resistant to degradation by UV light radiation so that the retroreflective sheeting can be used for long-term outdoor applications.

The resin composition (and process conditions) of the cube-corner elements is preferably chosen such that the resin is capable of penetrating the overlay film and then cured in situ or otherwise solidified, such that after curing, an interpenetrating network between the material of the cube corner elements and the material of the overlay film is formed, as described in U.S. Pat. No. 5,691,856. When the retroreflective sheeting is examined with an electron microscopy, it is preferred that a blurry boundary rather than a clear interface is observed between the body layer (e.g. film) and the cube corner elements.

During curing or solidification of the cube corner composition, depending on the composition of the cube corner material, individual cube corner elements may experience a certain degree of shrinking. If the elastic modulus of the overlay film is too high, torsional stresses can be applied to the cube corner elements if they shrink during curing. If the stresses are sufficiently high, then the cube corner elements can become distorted with a resulting degradation in optical performance. When the elastic modulus of the overlay film is sufficiently lower than the modulus of the cube corner element material, the overlay film can deform along with the shrinking of cube corner elements without exerting such deformational stresses on the cube corner elements that would lead to undesirable degradation of the optical characteristics.

Thermoplastic compositions employed for forming the cube-corner elements typically have a low linear mold shrinkage, i.e. less than 1 percent. As described in U.S. Pat. No. 5,691,845, the cube corner polymerizable resin compositions typically shrink upon curing. Preferably the resin will shrink at least 5 percent by volume when cured, more preferably between 5 and 20 percent by volume, when cured. The use of resin compositions that shrink is amenable to obtaining minimal or no land thickness.

In general, the modulus differential between the overlay film and the cube corner elements is typically on the order of 1.0 to $1.5 \times 10^7$ pascals or more. As the height of the cube corner elements diminishes, it is possible for this modulus differential to reach the low end of this range presumably because the smaller cube corner elements do not undergo as great of shrinkage during curing.

Various polymeric film substrates comprised of various thermosetting or thermoplastic polymers are suitable for use as the body layer. The body layer may be a single layer or multi-layer film.

Illustrative examples of polymers that may be employed as the body layer film for flexible retroreflective articles include (1) fluorinated polymers such as poly(chlorotrifluoroethylene), poly(tetrafluoroethylene-co-hexafluoropropylene), poly(tetrafluoroethylene-co-perfluoro(alkyl)vinylether), poly(vinylidene fluoride-co-hexafluoropropylene); (2) ionomeric ethylene copolymers poly(ethylene-co-methacrylic acid) with sodium or zinc irons such as SURLYN-8920 Brand and SURLYN-9910 Brand available from E.I. duPont Nemours, Wilmington, Del.; (3) low density polyethylenes such as low density polyethylene; linear low density polyethylene; and very low density polyethylene; plasticized vinyl halide polymers such as plasticized poly(vinylchloride); (4) polyethylene copolymers including acid functional polymers such as poly(ethylene-co-acrylic acid) "EAA", poly(ethylene-co-methacrylic acid) "EMA", poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)_n$- where n is 0 to 12, and poly(ethylene-co-vinylacetate) "EVA"; and (5) (e.g.) aliphatic polyurethanes.

In some embodiments, the body layer include olefinic polymeric material, typically comprising at least 50 wt-% of an alkylene having 2 to 8 carbon atoms with ethylene and propylene being most commonly employed. For example, the body layer may comprise a copolymer or terpolymer of ethylene and at least one comonomer selected from vinyl acetate, alkyl (meth)acrylate, (meth)acrylic acid and mixtures thereof.

Other body layers include for example poly(ethylene naphthalate), polycarbonate, poly(meth)acrylate (e.g., polymethyl methacrylate or "PMMA"), polyolefins (e.g., polypropylene or "PP"), polyesters (e.g., polyethylene terephthalate or "PET"), polyamides, polyimides, phenolic resins, cellulose diacetate, cellulose triacetate, polystyrene, styrene-acrylonitrile copolymers, cyclic olefin copolymers, epoxies, and the like.

The interface (16 of FIG. 1) between the body layer and unstructured surface of the (e.g. cube-corner) microstructure layer may include an adhesion promoting surface treatment. Various adhesion promoting surface treatments are known and include for example, mechanical roughening, chemical treatment, (air or inert gas such as nitrogen) corona treatment (such as described in US2006/0003178A1, plasma treatment, flame treatment, and actinic radiation. Alternatively or in addition thereto, the adhesion promoting surface treatment may include the application of a tie layer or primer layer. For example, a polyurethane primer layer can be employed by coating and drying an aliphatic polyester urethane dispersion commercially available from K.J. Quinn & Co., Seabrook, N.H. under the trade designation "QC 4820". The body layer surface and/or the unstructured (e.g. cube-corner) microstructure surface may comprise any combination of adhesion promoting surface treatments. Good adhesion between the body layer and (e.g. cube-corner) microstructures can be obtained in the absence of such adhesion promoting surface treatments.

Presently described are cube-corners or other microstructures comprised of a solidified (e.g. polymerized) resin wherein the polymerizable resin composition comprises at least one nitrogen-containing ingredient. Alternatively, only the base of the cubes or interface between the (e.g. cube-corner) microstructures and adjacent (e.g. body) layer comprise the nitrogen-containing polymerizable resin composition while the (e.g. bulk) remainder of the (e.g. cube-corner) microstructures comprise a different solidified resin such as a different polymerized resin or a solidified thermoplastic resin. This can be accomplished by first partially filling the recesses of the microstructured mold with a different thermoplastic or polymerizable resin composition. Alternatively, the body layer may be coated with the nitrogen-containing polymerizable resin (e.g. primer) composition which is then contacted with the (e.g. cube-corner) microstructures. The nitrogen-containing ingredient is surmised to act as an adhesion promoter. This aspect is particularly advantageous for improving bonding to adjacent layers, such as (e.g. olefinic) body layers or (e.g. olefinic) seal films.

A variety of nitrogen-containing ingredients can be employed in the (e.g. cube-corner) microstructure composition. Nitrogen-containing ingredients include monomers, oligomers, homopolymers, and copolymers of at least one moderately to strongly polar Lewis base-functional copolymerizable monomer. Polarity (e.g. hydrogen or ionic bonding ability) is frequently described by the use of terms such as "strongly", "moderately" and, "poorly". References describing these and other solubility terms include "Solvents paint testing manual", 3rd ea., G. G. Seward, Ed., American Society for Testing and Materials, Philadelphia, Pa., and "A three-dimensional approach to solubility", Journal of Paint Technology, Vol. 38, No. 496, pp. 269-280.

The (e.g. cube-corner) microstructure composition comprises one or more nitrogen-containing ingredients present in an amount of at least about 2 wt-%, 3 wt-%, 4 wt-%, 5 wt-%, 6 wt-%, 7 wt-%, 8 wt-%, 9 wt-%, or 10 wt-% solids based on the (e.g. cured) solidified composition. Typically, the amount of nitrogen-containing ingredient is no greater than about 60 wt-%, less than about 50 wt-%, less than about 40 wt-%, or less than about 30 wt-%. Whereas sufficient amounts tend to improve adhesion, excess nitrogen-containing ingredients can cause a decrease in optical performance.

In some embodiments, the (e.g. cube-corner) microstructured elements are preferably formed from a polymerizable resin capable of being crosslinked by a free radical polymerization mechanism by exposure to actinic radiation, for example, electron beam, ultraviolet light, or visible light. Alternatively or in addition to free radical polymerization, the polymerizable resin may be polymerized by thermal means with the addition of a thermal initiator such as benzoyl peroxide. Radiation-initiated cationically polymerizable resins also may be used.

The polymerizable resin composition comprises one or more polymerizable ethylenically unsaturated monomers, oligomers, prepolymers, or combination thereof. After curing, the ethylenically unsaturated components are reacted into a polymer. Preferred polymerizable compositions are 100% solids and substantially free of solvent.

In one embodiment, the cube-corner microstructures comprise the reaction product of a polymerizable resin comprising at least one (meth)acrylate functional nitrogen-containing ingredient. The polymerizable nitrogen-containing ingredient may be monofunctional, having for example a terminal (meth)acrylate group. Alternatively, the nitrogen-containing ingredient may be multifunctional having two or more (e.g. terminal or pendant) (meth)acrylate groups. This aspect is particularly preferred for polymerizable resin compositions that are polymerized by exposure to actinic radiation.

In another embodiment, the (e.g. cube-corner) microstructures comprise the reaction product of a polymerizable resin comprising at least one polymerizable amine-containing ingredient. As used herein "amine-containing" refers to a class of organic compounds having a terminal group or linking group derived from $NH_3$ by replacing one or more of the hydrogen atoms with alkyl groups. Amine-containing linking and terminal groups are generally secondary or tertiary amines depending on whether two, or three of the hydrogen atoms were replaced. Accordingly, the nitrogen atom of an amine-containing group is bonded to only hydrogen or alkyl groups. In contrast, organic amides are characterized by an acyl group (—$CONH_2$) usually attached to an organic group (R=$CONH_2$).

While the amine-containing ingredient preferably comprises one or more polymerizable (meth)acrylate groups, the amine-containing resin may comprise other ethylenically unsaturated or free-radically polymerizable groups. For example, the amine-containing resin may comprise vinyl groups. The polymerizable amine-containing ingredient may be monofunctional, having for example a terminal (meth) acrylate group. In one aspect, the polymerizable amine-containing ingredient has the general formula R1-amino-R2-(meth)acrylate, wherein R1 and R2 are independently alkyl groups having 1 to 6 carbon atoms such as N,N-dimethylaminoethyl acrylate ("DMAEA"), N,N-diethylaminoethyl acrylate ("DEAEA"), N,N-dimethylaminoethyl methacrylate ("DMAEMA"), and N,N-diethylaminoethyl methacrylate ("DEAEMA").

In another aspect, the polymerizable amine-containing ingredient may be an amine modified polyether acrylate oligomers such as are available from Sartomer under the trade designations "CN501", "CN502", "CN 550", "CN 551".

Cube-corner elements formed from the reaction product of a polymerizable resin composition including a polymerizable amine-containing monomer was found to be particularly suitable for bonding to adjacent olefinic layers, such as EAA body layers.

In yet another embodiment, the (e.g. cube corner) elements comprise a polymerizable resin comprising a nitrogen-containing polymer that is preferably soluble in the (e.g. cube) microstructure composition. By "soluble" it is meant that the polymer dissolves such that it forms an optically homogeneous transparent solution as can be detected by viewing the composition in a 3-inch diameter test tube. In addition to the compositions comprising being homogeneous and transparent, such composition are also stable, meaning that the composition does not separate after 6 months or longer (e.g. 1-2 years) of storage at ambient temperature.

Polymeric nitrogen-containing polymers typically lack polymerizable (e.g. ethylenically unsaturated) functional groups. Polymeric nitrogen-containing polymers also have a weight average molecular weight (Mw) greater than the monomeric species from which such polymer was prepared. Typically, nitrogen-containing polymers have a Mw of at least about 2,000 g/mole as measured for example with GPC with reference to polyethylene oxide standards. Often the Mw of the nitrogen-containing polymer is at least 5,000 g/mole (e.g. at least 10,000 g/mole). Although the Mw of various nitrogen-containing polymers may range up to about 1 million, typically the Mw is no greater than about 500,000 g/mole and often no greater than 100,000 g/mole. The nitrogen-containing polymers can also act as rheology modifiers in order that the final formulation has a suitable viscosity (e.g. 100-3000 cps) for the intended coating process. The use of nitrogen-containing polymers in lieu of monomeric adhesion promoters typically results in lower residual monomer content. For example, the residual nitrogen-containing monomer content of the (i.e. total) polymerizable composition is typically less than 50 ppm, often less than 25 ppm, and preferably less than 10 ppm.

Preferred nitrogen-containing polymers due to their solubility (e.g. with monomers such as phenoxy ethyl acrylate) include homopolymers and copolymers of vinylcaprolactam, ethyloxazoline homopolymers, vinylpyrrolidone copolymers, acrylonitrile-styrene copolymers, acrylonitrile-butadiene-styrene copolymers, (meth)acrylates polymers containing pendant nitrogen-containing moieties such as amino moieties, as well as various mixtures thereof.

Suitable nitrogen-containing polymers may be polymerized (e.g. in-situ) prior to adding the remainder of the ingredients. Conveniently however, various nitrogen-containing polymers are commercially available from several sources. For example, copolymers of vinylpyrrolidone (PVP) and vinyl acetate (VA) are commercially available from International Specialties Products (Wayne, N.J.) under the trade designation "PVP/VA" as well as from BASF (Mount Olive, N.J.) under the trade designations "Luviskol VA" and "Kollidon". Poly(vinylcaprolactam) homopolymers are commercially available from BASF under the trade designation "Luviskol Plus". Further, a terpolymer of vinylpyrrolidone, vinylcaprolactam, and dimethylaminoethyl methacrylate is commercially available from International Specialty Products, Texas City, Tex. under the trade designation "Advantage S". Linear polymers of ethyloxazoline and substituted ethyloxazoline are also commercially available from International Specialty Products under the trade designation "Aquazol". Further, acrylonitrile-styrene copolymers and acrylonitrile-butadiene-styrene terpolymers are commercially available from Dow Chemicals, Midland, Mich. under the respective trade designation "Tyril" and "Magnum".

Polymerizable resins suitable for forming the array of cube corner elements may be blends of photoinitiator and at least one compound bearing an acrylate group. Preferably the resin blend contains a monofunctional, a difunctional, or a polyfunctional compound to ensure formation of a cross-linked polymeric network upon irradiation.

Illustrative examples of resins that are capable of being polymerized by a free radical mechanism that can be used herein include acrylic-based resins derived from epoxies, polyesters, polyethers, and urethanes, ethylenically unsaturated compounds, isocyanate derivatives having at least one pendant acrylate group, epoxy resins other than acrylated epoxies, and mixtures and combinations thereof. The term acrylate is used here to encompass both acrylates and methacrylates. U.S. Pat. No. 4,576,850 (Martens) discloses examples of crosslinked resins that may be used in cube corner element arrays of the present invention.

Ethylenically unsaturated resins include both monomeric and polymeric compounds that contain atoms of carbon, hydrogen and oxygen, and optionally nitrogen, sulfur, and the halogens may be used herein. Oxygen or nitrogen atoms, or both, are generally present in ether, ester, urethane, amide, and urea groups. Ethylenically unsaturated compounds preferably have a molecular weight of less than about 4,000 and preferably are esters made from the reaction of compounds containing aliphatic monohydroxy groups, aliphatic polyhydroxy groups, and unsaturated carboxylic acids, such as acrylic acid, methacrylic acid, itaconic acid, crotonic acid, iso-crotonic acid, maleic acid, and the like. Such materials are typically readily available commercially and can be readily cross linked. Some illustrative examples of compounds having an acrylic or methacrylic group that are suitable for use in the invention are listed below:

(1) Monofunctional Compounds:

ethylacrylate, n-butylacrylate, isobutylacrylate, 2-ethylhexylacrylate, n-hexylacrylate, n-octylacrylate, isooctyl acrylate, bornyl acrylate, tetrahydrofurfuryl acrylate, 2-phenoxyethyl acrylate, and N,N-dimethylacrylamide;

(2) Difunctional Compounds:

1,4-butanediol diacrylate, 1,6-hexanediol diacrylate, neopentylglycol diacrylate, ethylene glycol diacrylate, triethyleneglycol diacrylate, tetraethylene glycol diacrylate, and diethylene glycol diacrylate; and (3) Polyfunctional Compounds:

trimethylolpropane triacrylate, glyceroltriacrylate, pentaerythritol triacrylate, pentaerythritol tetraacrylate, and tris (2-acryloyloxyethyl)isocyanurate.

Monofunctional compounds typically tend to provide faster penetration of the material of the overlay film and difunctional and polyfunctional compounds typically tend to provide more crosslinked, stronger bonds at the interface between the cube corner elements and overlay film.

Some representative examples of other ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide.

Cationically polymerizable materials including but are not limited to materials containing epoxy and vinyl ether functional groups may be used herein. These systems are photoinitiated by onium salt initiators, such as triarylsulfonium, and diaryliodonium salts.

In one embodiment, the polymerizable resin comprises in addition to the nitrogen-containing ingredient previously described, a combination of at least one difunctional epoxy (meth)acrylate, at least one difunctional (meth)acrylate monomer, and at least one polyfunctional compound having at least three (meth)acrylate groups.

The difunctional epoxy (meth)acrylate, as well as the difunctional (meth)acrylate monomer may be present in the polymerizable composition in an amount of at least about 5 wt-%, 10 wt-%, and any amount there between. Typically, the amount of such difunctional (meth)acrylate monomer does not exceed about 40 wt-%. One exemplary epoxy diacrylate is commercially available from Cytek under the trade designation "Ebecryl 3720".

The polyfunctional compound is typically present in the polymerizable composition in an amount of at least about 10 wt-% (e.g. 15 wt-%, 20 wt-%, 25 wt-%, 30 wt-%, 35 wt-%, 40 wt-% and any amount there between). Typically, the amount of polyfunctional compound is not greater than about 70 wt-%.

Since methacrylate groups tend to be less reactive than acrylate groups, acrylate functionality is sometimes preferred.

Radiation (e.g. UV) curable compositions generally include at least one photoinitiator. The photoinitiator or combination of photoinitiators can be used at a concentration of about 0.1 to about 10 weight percent. More preferably, the photoinitiator or combination thereof is used at a concentration of about 0.2 to about 3 wt-%.

In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoydiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis (2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

Free radical scavengers or antioxidants may be used, typically, at about 0.01 to 0.5 weight percent. Illustrative examples of suitable antioxidants include hindered phenolic resins such as those available under the trade designations "Irganox 1010", "Irganox 1076", "Irganox 1035", and "Irgafos 168" from Ciba-Geigy Corp.

The cube-corner or body layer composition may optionally comprise one or more reactive (e.g. ethylenically unsaturated) ingredients and/or one or more non-reactive ingredients. Various additives such as solvent, chain transfer agents, colorants (e.g. dyes), antioxidants, light stabilizers, UV absorbers, processing aids such as antiblocking agents, releasing agents, lubricants, and other additives may be added to the body portion or cube-corner elements as described in U.S. Pat. No. 5,450,235 incorporated herein by reference.

When thermoplastic polymers are used in the (e.g. cube) microstructures, the glass transition temperature generally is greater than 80° C., and the softening temperature is typically greater than 150° C. Generally, the thermoplastic polymers used in the cube-corner layer are amorphous or semi-crystalline.

Examples of thermoplastic polymers that may be used in the cube-corner elements include acrylic polymers such as poly(methyl methacrylate); polycarbonates; cellulosics such as cellulose acetate, cellulose (acetate-co-butyrate), cellulose nitrate; epoxies; polyesters such as poly(butylene terephthalate), poly(ethylene terephthalate); fluoropolymers such as poly(chlorofluoroethylene), poly(vinylidene fluororide); polyamides such as poly(caprolactam), poly(amino caproic acid), poly(hexamethylene diamine-co-adipic acid), poly (amide-co-imide), and poly(ester-co-imide); polyetherketones; poly(etherimide); polyolefins such as poly(methylpentene); poly(phenylene ether); poly(phenylene sulfide); poly (styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a poly(ester) and poly(carbonate) blend, and a fluoropolymer and acrylic polymer blend.

Retroreflective sheeting can be made according to a variety of known methods for making cube-corner sheeting such as described in U.S. Pat. Nos. 3,689,346; 3,811,983; 4,332,847; 4,601,861; 5,491,586; 5,642,222; and 5,691,846; incorporated herein by reference.

Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, direct machining techniques, and techniques that employ laminae such as described in U.S. Pat. No. 7,188,960. In some embodiments, the elements have a shape in plan view selected from trapezoids, rectangles, parallelograms, pentagons, and hexagons.

U.S. Pat. Nos. 3,684,348 and 3,811,983 describe retroreflective material and a method of making a composite material wherein a fluid molding material is deposited on a molding surface having cube corner recesses and a preformed body member applied thereto. The molding material is then hardened and bonded to the body member. The molding material may be a molten resin and the solidification thereof accomplished at least in part by cooling, the inherent nature of the molten resin producing bonding to the body member thereof. Alternatively, the molding material may be fluid resin having cross-linkable groups and the solidification thereof may be accomplished at least in part by cross-linking of the resin. The molding material may also be a partially polymerized resin formulation and wherein the solidification thereof is accomplished at least in part by polymerization of the resin formulation.

The polymerizable resin may be poured or pumped directly into a dispenser that feeds a slot die apparatus. For embodiments wherein the polymer resin is a reactive resin, the method of manufacturing the sheeting further comprises curing the resin in one or more steps. For example the resin may be cured upon exposure to a suitable radiant energy source such as actinic radiation, ultraviolet light, visible light, etc. depending upon the nature of the polymerizable resin to sufficiently harden the resin prior to removal from the tool. Combinations of cooling and curing may also be employed.

Regardless of which method is employed to form the microreplicated (e.g. cube-corner elements), it is surmised that higher die force and/or temperature aids in the diffusion and dissolution of the gas that was formerly in the tool cavities into the thermoplastic or polymerizable resin before solidification of the resin. Carbon containing gases and gases with an atomic weight less than $O_2$ can aid in the diffusion and dissolution of the gas formerly in the tool cavities during manufacturing.

Flexible cube-corner retroreflective sheetings of the invention can be made by: (a) forming a plurality of cube-corner elements from a light transmissible material; and (b) securing a body layer to the plurality of cube-corner elements. In one embodiment, the method generally comprises providing a (e.g. heated) electroplated nickel tool having a molding surface with a plurality of cavities suitable for forming desired microstructure elements (e.g., cube corner elements of a retroreflective article) and applying to the molding surface a flowable (e.g. curable) resin composition in amount sufficient to at least fill the cavities. The (exposed substantially planar) resin composition surface is then contacted with a body layer film followed by curing the resin to form a composite sheeting comprising an array of microstructure elements (e.g., cube corner elements) bonded to the overlay film. The composite sheeting is removed from the tool followed by applying mechanical stress to the sheeting so as to cause a fractured separation of substantially each individual microstructure element from surrounding microstructure elements, if they were connected by a land. Alternatively, the sheeting may be fractured such that a plurality of cube corner segments are formed, each segment comprising two or more cube corner elements. (See for example U.S. Pat. No. 6,318,867.)

A common method for improving the uniformity of total light return (TLR) with respect to orientation is tiling, i.e. placing a multiplicity of small tooling sections in more than one orientation in the final production, as described for example in U.S. Pat. No. 4,243,618 (Van Arnam), U.S. Pat. No. 4,202,600; and U.S. Pat. No. 5,936,770 (Nestegard et al.). The resulting sheeting has a first array of cube-corner elements having a different orientation than an adjacent array of cube-corner elements.

The roll of retroreflective sheeting formed has a width bound by longitudinal edges of the roll and a microstructured surface having an array of cube-corner elements, e.g. defined by three mutually intersecting grooves. Depending on the orientation of the tool one of the grooves may be substantially perpendicular, parallel, or at an angle between 0° and 90° to the longitudinal edge of the roll of sheeting. Particularly in the case of full cube microstructures, it is preferred that during manufacturing the channels of the tool are orientated substantially parallel to the relative direction of the advancing tool as described in U.S. Pat. No. 6,884,371.

Typically it will be desired that the retroreflective sheeting further comprise a sealing layer adhered to the (e.g. structured surface) of the microstructured layer on a surface opposite the overlay film such as is disclosed in U.S. Pat. No. 4,025,159. Preferably, the sealing layer comprises a thermoplastic material. Illustrative examples include ionomeric ethylene copolymers, plasticized vinyl halide polymers, acid functional polyethylene copolymers, aliphatic polyurethanes, aromatic polyurethanes, and combinations thereof. In certain applications, this optional sealing layer can provide significant protection for the cube corner elements of the composite material from environmental effects, as well as maintaining a sealed air layer around the cube corner elements which is essential for creating the refractive index differential needed for total internal reflection.

As a result of the decoupling of cube corner elements provided in the invention, the sealing layer can be adhered, at least in part, directly to the overlay film between independent cube corner elements, typically in a pattern of sealing regions or legs thereby creating cells comprising a plurality of retroreflective cube corner elements. Illustrative examples of sealing techniques include radio frequency welding, a conductive heat sealing process, ultrasonic welding, and reactive components, e.g., a sealing material that will develop a bond to the overlay film. Selection of a sealing approach will depend in large part on the nature of the sealing layer and overlay film.

Preferably, the sealing layer shall comprise a thermoplastic material. Such materials lend themselves well to fusing via relatively simple and commonly available thermal techniques. In some embodiment, the sealing layer comprises a copolymer or terpolymers of ethylene and at least one comonomer selected from vinyl acetate, alkyl (meth)acrylate, and mixtures thereof, as described in U.S. Ser. No. 11/379,130, filed Apr. 18, 2006 and incorporated herein by reference.

The general practice followed in the art for sealing a thermoplastic layer to a retroreflective cube corner material is to use thermal embossing techniques which result in a form of "chain link" pattern of sealed zones which create sealed pockets of a plurality of individual cube corner elements. Closer inspection of a portion of a leg or "link" of a thermally sealed area indicates that for thermoplastic cube corner elements, the thermal fusion process results in significant distortion of the cube corner elements in fusion zones. This type of thermal distortion of the sealing legs typically extends well beyond the zone of actual sealing due to conductive effects. If an appreciable number of individual cube corner elements in the material are so distributed, the overall optical properties of the sheeting can decrease significantly, e.g., 30 to 40 percent, in comparison to unsealed sheeting.

The retroreflective sheeting is useful for a variety of uses such as traffic signs, pavement markings, vehicle markings and personal safety articles, in view of its flexibility is combination with retroreflected brightness. The coefficient of retroreflection, $R_A$, may be measured according to US Federal Test Method Standard 370 at –4° entrance, 0° orientation, at various observation angles. Retroreflective sheeting typically has a coefficient of retroreflection, $R_A$, at –4° entrance, 0° orientation, and an observation angle of 0.2° of at least 50, 100, 150, 200, or 250 candelas/lux/m².

Due to the flexibility of the retroreflective sheeting, the sheeting is amendable for application to flexible substrates such as canvas and other fabrics, corrugated or riveted surfaces, as well as curved surfaces having a simple or compound curve. The flexible retroreflective sheeting is also amenable for application to devices subject to thermal expansion and contraction (e.g. traffic devices such as barrels, cones).

Features and advantages of this invention are further illustrated in the following examples. It is to be expressly understood, however, that while the examples serve this purpose, the particular ingredients and amounts used as well as other conditions and details are not to be construed in a manner that would unduly limit the scope of this invention.

Examples 1-12 and Comparatives A and B

Comparatives A and B (i.e. without a nitrogen-containing resin) were prepared by combining 25 wt-% bisphenol A epoxy diacrylate, commercially available from Cytek under the trade designation "Ebecryl 3720", 50 wt-% TMPTA (trimethylol propane triacrylate) and 25 wt-% 1,6 hexanediol diacrylate (HDDA). Comparative A had 0.5 pph "Lucirin TPO" photoinitiator; whereas Comparative B had 0.5 pph "Lucirin TPO" and 0.5 pph "Darocure 1173" photoinitiator.

The kinds and amount of each ingredient used in exemplary compositions 1-12 are listed in Table 1. The nitrogen-containing ingredients utilized were diethylaminoethyl acrylate ("DEAEA") and dimethylaminoethyl acrylate ("DMAEA"). Each of Examples 1-12 contained 0.5 pph "Lucirin TPO-L".

A polyethylene terephthalate (PET) carrier was prepared by extruding a film approximately 2 mils thick. EAA film was prepared by heating EAA from Dow Chemical Company under the trade designation "Primacor 3440" to its melt temperature and extruding it at 4 mil thickness on the PET carrier.

Each of the polymerizable resin formulations in Table 1 was knife coated at a thickness of about 2 mils onto a PET carrier similar to that described above. The EAA film layer of the EAA film on the PET carrier was applied using hand pressure to the polymerizable resin layer on the PET carrier.

Each assembly was exposed to UV radiation at a rate of 15 feet/per/minute using Fusion D UV lamps operating at 600 W/inch to cure the polymerizable resin formulation.

For Comparatives A and B, the polymerizable resin layer did not adhere to the EAA layer. For Examples 1-12, the polymerizable resin layer adhered to the EAA layer.

TABLE 1

| Ex. | Ebecryl 3720 | TMPTA | HDDA | DEAEA | DMAEA |
|-----|--------------|-------|------|-------|-------|
| A   | 25 | 50 | 25 | 0  | 0  |
| 1   | 25 | 50 | 21 | 4  | 0  |
| 2   | 25 | 50 | 17 | 8  | 0  |
| 3   | 25 | 50 | 13 | 12 | 0  |
| 4   | 25 | 50 | 21 | 0  | 4  |
| 5   | 25 | 50 | 17 | 0  | 8  |
| 6   | 25 | 50 | 13 | 0  | 12 |
| 7   | 25 | 46 | 25 | 4  | 0  |
| 8   | 25 | 42 | 25 | 8  | 0  |
| 9   | 25 | 38 | 25 | 12 | 0  |
| 10  | 25 | 46 | 25 | 0  | 4  |
| 11  | 25 | 42 | 25 | 0  | 8  |
| 12  | 25 | 38 | 25 | 0  | 12 |
| B   | 25 | 50 | 25 | 0  | 0  |

Examples 13-14

Cube corner microstructures were provided on a body layer as generally described in and illustrated by FIG. 5 of U.S. Pat. No. 5,691,846. The cube corner structure (prior to separating the structure into individual cubes) had 3 sets of intersecting grooves as shown in FIG. 2 having a pitch (i.e. primary groove spacing) of 0.007" with base triangle apertures of 55.5/55.5/69 degrees resulting in the height of the cube corner elements being 76.2 microns (3.5 mil).

The cube corner structures were prepared using Comparative C (i.e. without amine) and two exemplary polymerizable resin compositions, Examples 13 and 14 of Table 2 each having 0.5% "Lucirin TPO" photoinitiator added.

EAA (Primacor 3440) film was cast at a thickness of 4 mils onto a polyethylene terephathalate (PET) carrier as described for Examples 1-12 and Comparatives A and B. The EAA surface was corona treated (1.5 J/cm²) and each of the resin compositions at room temperature was cast at 15 fpm onto a metal tool heated to 130° F. The resin composition contacted the cube corner structure via a rubber nip roller having a gap set to minimize the amount of resin composition applied over the cavities of the tool. The resin layer was cured through the EAA film layer and carrier film with one Fusion D UV lamp (available from Fusion Systems, Rockville, Md.) set at 360 W/in. Dichroic filters were used in front of the UV lamps to minimize IR heating of the construction. Upon completion of the microreplication process and removal from the tool, the polymerizable resin side of the composite with the cube corner elements was irradiated by a Fusion D UV lamp operating at 100% to provide a post-UV irradiation cure. The construction was passed through an oven set at 150° F. to relax the stresses in the film.

TABLE 2

| Example | Ebecryl3720 | TMPTA | HDDA | DMAEA |
|---------|-------------|-------|------|-------|
| C  | 25 | 50 | 25 |    |
| 13 | 25 | 50 | 13 | 12 |
| 14 | 25 | 38 | 25 | 12 |

Roughly, 20 yards into the run with the control resin, it was observed that the cured polymerizable resin was not releasing from the metal tool, but was retained in the microstructured cavities.

In contrast, when the cube corner structures were prepared from a resin with the amine monomer (DMAEA), the polymerizable resin cleanly released form the metal tool.

The coefficient of retroreflection, $R_A$, of the resulting cube-corner sheeting was evaluated according to US Federal Test Method Standard 370 using an observation angle of 0.2°, an orientation of 0° and an entrance angle of −4°. $R_A$ of Example 13 was 1122 candelas/lux/m². $R_A$ of Example 14 was 1151 candelas/lux/m².

What is claimed is:

1. A flexible retroreflective article comprising:
   a light transmissive polymeric body layer having an elastic modulus of less than $7 \times 10^8$ pascals; and
   a plurality of cube-corner elements having an elastic modulus that is greater than $16 \times 10^8$ pascals and projecting from the body layer, wherein at least some of the cube-corner elements, notwithstanding any other layer, include the reaction product of a polymerizable resin composition comprising at least 2 wt-% of a polymerizable amine-containing ingredient.

2. The flexible retroreflective article of claim 1 wherein the amount of amine containing ingredient ranges from about 5 wt-% to about 20 wt-%.

3. The flexible retroreflective article of claim 1 wherein the polymerizable amine-containing ingredient includes a (meth)acrylate functionality.

4. The flexible retroreflective article of claim 3 wherein the polymerizable amine-containing ingredient is a R1-amino-R2 (meth)acrylate monomer wherein R1 and R2 are independently alkyl groups having 1 to 6 carbon atoms.

5. The flexible retroreflective article of claim 4 wherein the amine containing monomer is selected from diethylaminoethyl (meth)acrylate, dimethylaminoethyl (meth)acrylate, and mixtures thereof.

6. The flexible retroreflective article of claim 1 wherein the polymerizable resin comprises at least 20 wt-% of a crosslinker having at least three (meth)acrylate groups.

7. The flexible retroreflective article of claim 1 wherein the polymerizable resin further comprises at least 10 wt-% of epoxy (meth)acrylate having at least two (meth)acrylate groups.

8. The flexible retroreflective article of claim 1 wherein the body layer further comprises an adhesion promoting surface treatment selected from a prime layer, corona treatment, or a combination thereof.

9. The flexible retroreflective article of claim 1 wherein the body layer comprises a polymeric material selected from ionomeric ethylene copolymers, low density polyethylenes, polyethylene copolymers, plasticized poly(vinylchloride), polyurethane, and mixtures thereof.

10. The flexible retroreflective article of claim 1 wherein the body layer comprises a copolymer or terpolymer of ethylene and at least one comonomer selected from vinyl acetate, alkyl (meth)acrylate, (meth)acrylic acid and mixtures thereof.

11. The flexible retroreflective article of claim 1 wherein the article is a roll of retroreflective sheeting having a width bound by edges of the roll, the cube-corner elements are formed by three mutually intersecting grooves, and one of the grooves is substantially perpendicular to the edge of the roll of sheeting.

12. The flexible retroreflective article of claim 1 wherein the sheeting has a first array of cube-corner elements having a different orientation than an adjacent array of cube-corner elements.

13. The flexible retroreflective article of claim 1 further comprising a seal film bonded to portions of the cube-corner elements.

14. The flexible retroreflective article of claim 13 wherein the seal film comprises at least 50 wt-% of alkylene having 2 to 8 carbon atoms.

15. The flexible retroreflective article of claim 13 wherein the seal film comprises a copolymer or terpolymers of ethylene and at least one comonomer selected from vinyl acetate, alkyl (meth)acrylate, and mixtures thereof.

16. The flexible retroreflective article of claim 1 wherein the cube-corner elements comprise a specular reflective coating.

17. The flexible retroreflective article of claim 1, wherein the polymerizable amine-containing ingredient includes a UV-curable acrylate.

18. A retroreflective article, comprising:
    a plurality of light transmissive cube-corner elements having an elastic modulus that is greater than $16 \times 10^8$ pascals, the cube-corner elements, notwithstanding any other layer, comprising the reaction product of a polymerizable resin comprising at least 2 wt-% of a (meth) acrylate functional nitrogen-containing ingredient, a polymerizable amine containing ingredient, a nitrogen-containing polymer, or mixture thereof.

19. The retroreflective article of claim 18 wherein the cube-corner elements project from a major surface of an integral body layer.

20. The retroreflective article of claim 18 wherein the cube-corner elements project from a major surface of an elastomeric body layer.

21. The retroreflective article of claim 18 wherein the cube-corner elements are adjacent to a layer comprising at least 50 wt-% of one or more alkylenes having 2 to 8 carbon atoms.

22. The retroreflective article of claim 21 wherein the adjacent layer is a body layer or seal film layer.

23. A microstructured article comprising:
    a plurality of microstructured elements projecting from a major surface, wherein the microstructured elements have an elastic modulus that is greater than $16 \times 10^8$ pascals, notwithstanding any other layer, and comprise the reaction product of a polymerizable resin comprising at least 2 wt-% of a polymerizable amine-containing ingredient.

* * * * *

UNITED STATES PATENT AND TRADEMARK OFFICE
CERTIFICATE OF CORRECTION

| | | |
|---|---|---|
| PATENT NO. | : 7,862,187 B2 | |
| APPLICATION NO. | : 11/734349 | |
| DATED | : January 4, 2011 | |
| INVENTOR(S) | : Bimal V Thakkar | |

It is certified that error appears in the above-identified patent and that said Letters Patent is hereby corrected as shown below:

Column 3
Line 53, delete "Appledom et al." and insert -- Appledorn et al. --, therefor.

Column 10
Line 53, delete "poly(vinylidene fluororide);" and insert -- poly(vinylidene fluoride); --, therefor.

Column 14
Line 41 (approx.), delete "terephathalate" and insert -- terephthalate --, therefor.

Column 15
Line 7, delete "form" and insert -- from --, therefor.

Column 15
Line 28 (approx.), in Claim 2, delete "amine containing" and insert -- amine-containing --, therefor.

Column 15
Line 38 (approx.), in Claim 5, delete "amine containing" and insert -- amine-containing --, therefor.

Column 16
Line 37, in Claim 18, delete "amine containing" and insert -- amine-containing --, therefor.

Column 16
Line 50, in Claim 23, after "article" insert -- , --.

Signed and Sealed this
Twenty-fourth Day of May, 2011

David J. Kappos
*Director of the United States Patent and Trademark Office*